United States Patent [19]

Yamagami et al.

[11] Patent Number: 5,670,969
[45] Date of Patent: Sep. 23, 1997

[54] INFORMATION PROCESSING APPARATUS

[75] Inventors: Hajime Yamagami, Yokohama; Takashi Tsunehiro, Ebina, both of Japan

[73] Assignee: Hitachi, Ltd., Tokyo, Japan

[21] Appl. No.: 953,953

[22] Filed: Sep. 29, 1992

[30] Foreign Application Priority Data

Oct. 14, 1991 [JP] Japan ................................ 3-264617

[51] Int. Cl.⁶ .................................................. G09G 5/00
[52] U.S. Cl. ............................... 345/1; 345/87; 345/903
[58] Field of Search .............................. 340/706, 700, 340/712, 707, 717, 711; 364/708, 709.1, 708.1; 361/391, 394, 395; 345/1, 2, 3, 104, 156, 157, 179, 147, 204, 211, 903, 87, 680, 681, 686

[56] References Cited

U.S. PATENT DOCUMENTS

| | | | |
|---|---|---|---|
| 4,730,186 | 3/1988 | Koga et al. | 340/716 |
| 4,737,896 | 4/1988 | Mochizuki et al. | 340/784 |
| 4,749,364 | 6/1988 | Arney et al. | 439/372 |
| 5,103,376 | 4/1992 | Blonder | 364/708 |
| 5,128,662 | 7/1992 | Failla | 340/700 |
| 5,138,565 | 8/1992 | Sato | 364/708 |
| 5,144,290 | 9/1992 | Honda et al. | 364/708 |
| 5,166,893 | 11/1992 | Hosoi | 364/708 |
| 5,175,672 | 12/1992 | Conner | 364/708.1 |
| 5,202,817 | 4/1993 | Koenck et al. | 361/393 |
| 5,262,759 | 11/1993 | Moriconi et al. | 345/30 |

FOREIGN PATENT DOCUMENTS 4-70693  3/1992  Japan.

*Primary Examiner*—Xiao Wu
*Attorney, Agent, or Firm*—Antonelli, Terry, Stout & Kraus, LLP.

[57] ABSTRACT

An information processing apparatus comprises a main body of the information processing apparatus and a display device which is replaceably connected to the main body. The main body comprises a CPU, a system bus connected to the CPU and a main body connector connected to the system bus. The display device comprises a panel connector connected to the main body connector, a display, and a controller connected to the panel connector for controlling the display in accordance with information received from the CPU.

14 Claims, 8 Drawing Sheets

FIG. 9

CONNECTOR

| NO | SIGNAL | NO | SIGNAL |
|---|---|---|---|
| 1 | A0 | 26 | GND |
| 2 | A1 | 27 | D0 |
| 3 | A2 | 28 | D1 |
| 4 | A3 | 29 | D2 |
| 5 | A4 | 30 | D3 |
| 6 | A5 | 31 | D4 |
| 7 | A6 | 32 | D5 |
| 8 | A7 | 33 | D6 |
| 9 | A8 | 34 | D7 |
| 10 | A9 | 35 | GND |
| 11 | A10 | 36 | MEMR |
| 12 | A11 | 37 | MEMW |
| 13 | A12 | 38 | IOR |
| 14 | A13 | 39 | IOW |
| 15 | A14 | 40 | AEN |
| 16 | A15 | 41 | RDY |
| 17 | A16 | 42 | IRQ |
| 18 | A17 | 43 | GND |
| 19 | A18 | 44 | CLK |
| 20 | A19 | 45 | GND |
| 21 | 5V | 46 | GND |
| 22 | 5V | 47 | GND |
| 23 | 5V | 48 | GND |
| 24 | VLCD | 49 | GND |
| 25 | VLCD | 50 | GND |

INFORMATION PROCESSING APPARATUS

BACKGROUND OF THE INVENTION

The present invention relates to an information processing apparatus such as personal computer or workstation having a display device.

A flat panel has been widely used in a display device of an information processing apparatus such as portable notebook type or lap-top type personal computer or workstation.

A panel type display device such as a super-twisted nematic (STN) liquid crystal panel, a plasma panel, thin film transistor (TFT) panel or an electro-luminescence device is frequently used for such a flat panel.

FIG. 5 shows a construction of a prior art portable information processing apparatus.

In FIG. 5, numeral 1 denotes a flat panel and numeral 2 denotes a main body. The flat panel 1 and the main body 2 are electrically interconnected by a cable 3.

A liquid crystal driver for liquid crystal to be used is mounted on the flat panel 1 and the cable 3 is connected to the liquid crystal drive in the flat panel 1.

FIG. 6 shows an internal configuration of the flat panel 1 and the main body 2.

In FIG. 6, an STN liquid crystal panel 4 is used for the flat panel 1. As to the internal configuration of the main body 2, only those which relate to the control of the flat panel 1 are shown.

In the main body 2, a display memory 13 stores image information (text codes and attribute codes). A display controller 11 controls the read/write of the display memory 13, and converts the read image information to display data which is supplied to a panel controller 12. The panel controller 12 makes timing conversion and tonality conversion to the input display data in accordance with a specification of the flat panel 1 to produce display data 9 and a panel control signal 8. A power supply unit 14 supplies a power to the flat panel 1 through a power supply line 10.

The display controller 11 of the main body 2 is connected to a system bus 16 for connecting an expansion slot 15 for expanding a function of the main body 2. The system bus transmits and receives an address signal which represents a memory space and an I/O space, a data signal for transmitting and receiving data and a command signal for transmitting and receiving data.

On the other hand, the flat panel 1 receives the panel control signal 8, the display data 9 and the panel power supply line 10 through the cable 3. The panel power supply line 10 is supplied to a liquid crystal drive voltage generator 6.

The liquid crystal device voltage generator 6 generates a liquid crystal drive voltage 7 for driving the liquid crystal of the STN panel 4. Numeral 5 denotes a liquid crystal driver which selects the liquid crystal drive voltage 7 generated by the liquid crystal voltage generator 6 in accordance with the panel control signal 8 and the display data 9 and supplies it to the STN panel 4.

In this manner, the STN liquid crystal panel 4 can display an image corresponding to the input display data 9.

Other prior art techniques relating to the flat panel are disclosed in JP-A-2-308316 and JP-A-373011.

SUMMARY OF THE INVENTION

It is an object of the present invention to provide an information processing apparatus which permits exchangeable connection of a suitable display device to a main body of the information processing apparatus.

It is another object of the present invention to provide an inexpensive information processing apparatus.

It is other object of the present invention to provide a compact information processing apparatus.

A panel type display device which may be used for a flat panel includes STN liquid crystal, plasma and TFT liquid crystal panel electroluminescence devices.

As the demands for the number of tonalities and the trend of multicolor increased, the quality and function of the panel type display device and the panel controller have been improved. There is also a desire to provide a touch panel or light pen to the flat panel.

Thus, there is a demand that only a display device is replaced so that a suitable display device is connected to the main body depending on an application.

In the prior art, it is not possible to meet such a demand because an interface between the flat panel 1 and the main body 2 differs depending on the type of panel type display device and the presence or absence of the touch panel. For example, since the panel control signal 8 and the display data 9 differs from type to type of the panel type display device, it is necessary to replace the panel controller 12 and the display controller 11 in the main body 2 when a different type of panel type display device is to be used.

The present invention provides an information processing apparatus which permit the connection of a suitable display device to the main body.

In order to achieve the above objects, the present invention provides an information processing apparatus comprising a main unit including a central processing unit (CPU), a system bus connected to the CPU and a main unit connector connected to the system bus, and a display device including a panel connector pluggable to the main body connector and connected to the main body connector, a display and display control means for controlling the display in accordance with data received from the CPU through the system bus, the main body connector and the panel connector.

In accordance with the information processing apparatus of the present invention, the display device is provided with all circuits required for the types of display devices and the interface between the display device and the main body is set on the system bus. Accordingly, whatever the type of the display device is, any display device suitable for the application may be connected to the main body.

In accordance with the present invention, the information processing apparatus which permits the exchangeable connection of a suitable display device to the main body of the information processing apparatus is provided. The display device may be selectable depending on the purpose and the display device may be shared with other information processing apparatus. As a result, an inexpensive information processing apparatus is provided. Further, since the display device is separated from the main body of the information processing apparatus, the main body of the information processing apparatus may be compacted.

BRIEF DESCRIPTION OF THE DRAWINGS

FIG. 9 shows an interface signal of a connector.

DESCRIPTION OF THE PREFERRED EMBODIMENTS

An embodiment of the information processing apparatus of the present invention is now explained.

Figure 1:
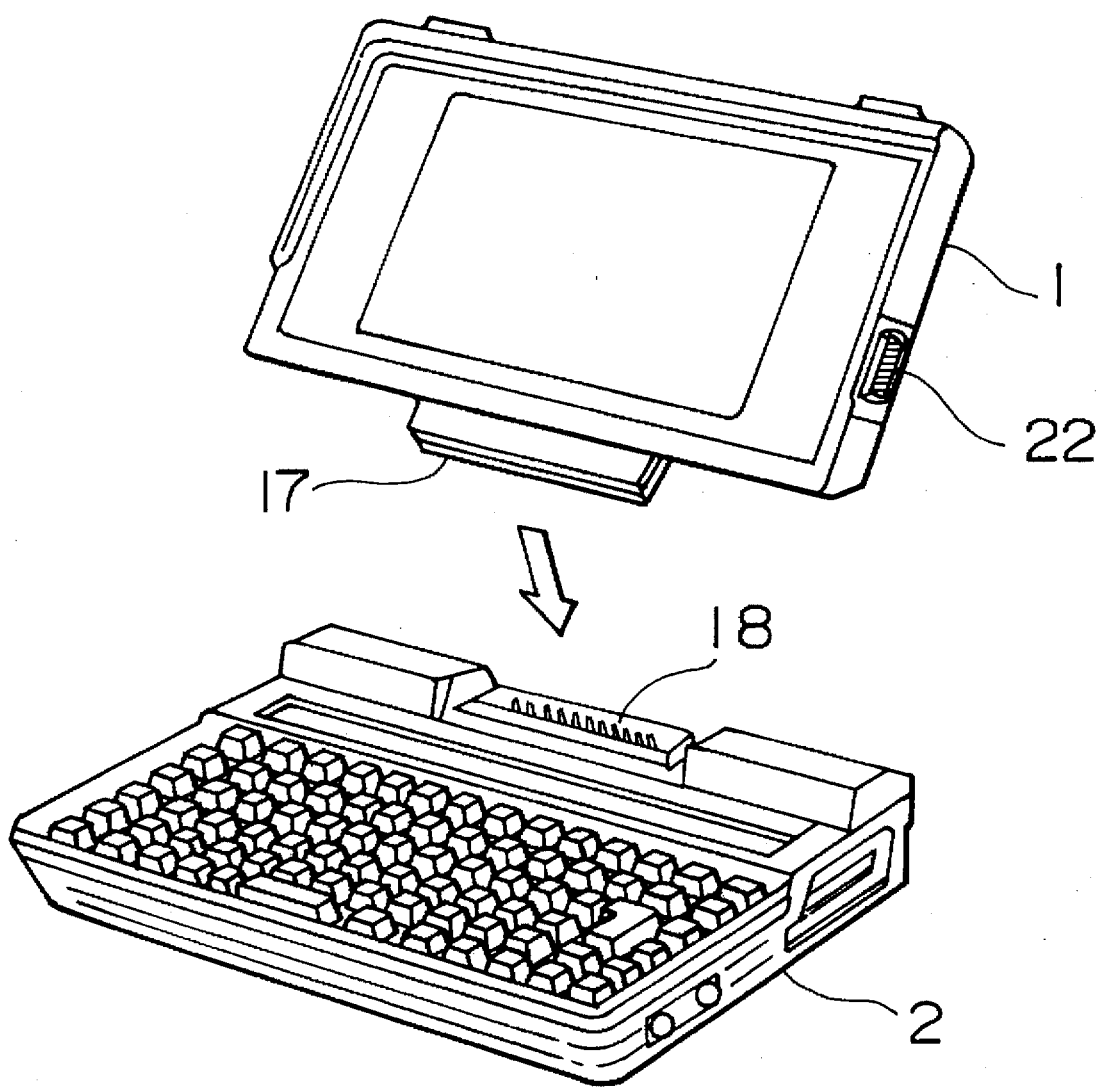
FIG. 1 shows a construction of one embodiment of an information processing apparatus of the present invention.

FIG. 1 shows a construction of the present embodiment of the information processing apparatus.

As shown, the information processing apparatus of the present embodiment comprises a flat panel 1 and a main body 2. Numeral 22 denotes a CRT connector, numeral 17 denotes a panel connector and numeral 18 denotes a main body connector. The main body 2 and the flat panel 1 are pluggably connected by male/famale panel connector 17 and a main body connector 18.

The CRT connector 22 is for outputting a video signal for a CRT and it is arranged not in the main body 2 but on a side of the flat panel 1 while taking into consideration that an expansion component may be attached to a rear side of the main body 2 and a space to arrange the connector in the main body 2 is limited.

Figure 2:
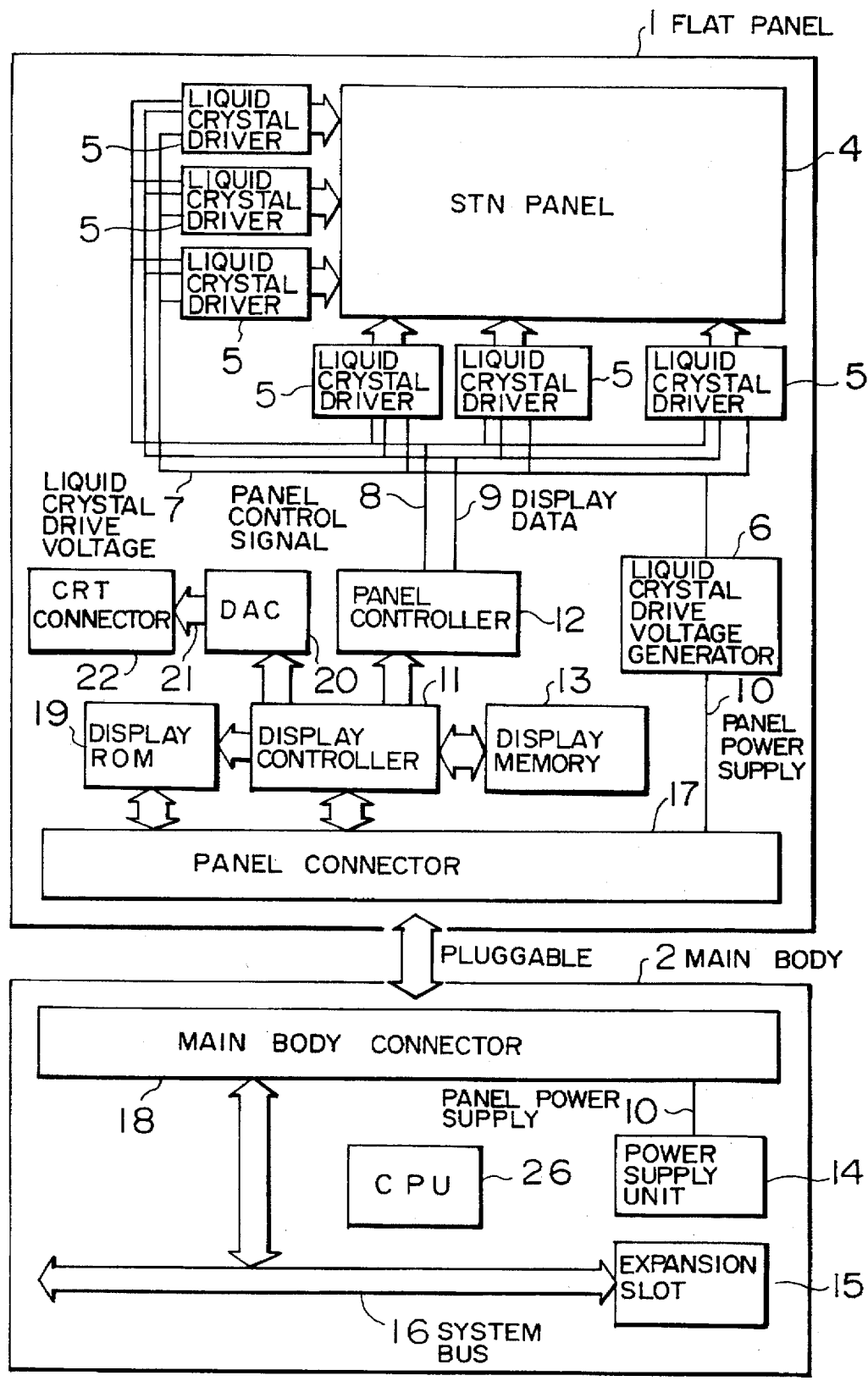
FIG. 2 shows a block diagram of a first internal configuration of a main body and a flat panel of the embodiment of the information processing apparatus of the present invention.

An internal configuration of the main body 2 and the flat panel 1 when a liquid crystal panel is used is shown in FIG. 2. Only those of the internal configuration of the main body 2 which relate to the control of the flat panel 1 are shown.

Numeral 2 denotes the main body which include a power supply unit 14, a system bus 16, an expansion slot 15 and a central processing unit (CPU) 26. Numeral 1 denotes the flat panel which includes a display memory 13, a display controller 11, a panel controller 12, a liquid crystal drive voltage generator 6, a liquid crystal driver 5, an STN liquid crystal panel 4, a display ROM 19, a DAC 20 and a CRT connector 22.

In FIG. 2, those elements designated by the same numerals as that of the prior art information processing apparatus (FIG. 6) have the same function as those of the corresponding means of the prior art information processing apparatus.

The information processing apparatus shown in FIG. 2 differs from the prior art information processing apparatus (FIG. 6) in that the display controller 11, the panel controller 12 and the display memory 13 are built not in the main body 2 but in the flat panel 1, the display ROM 19 which stores a display BIOS which is a program necessary for the display controller 11 and the main body 2 to control the display of the flat panel is provided, and the DAC 20 which generates video analog data 21 and the CRT connector 22 are provided in the flat panel 1 to permit the connection of the CRT to the flat panel 1. As shown, an interface signal of the system bus 16 and a panel power supply line 10 are connected to the connector. The system bus 16 is used by the CPU of the main body 2 to transmit and receive an address signal representing a memory space and an I/O space, a data signal for transmitting and receiving data, and a command signal for controlling the transmission and the reception of data.

An operation thereof is explained below.

In the flat panel 1, when the display controller 11 receives image information from the main body 2 through the panel connector 17, it modifies the content of the display memory 13 in accordance with the input image information. The display controller 11 reads out the image information from the display memory 13, converts it to display data and outputs it to the panel controller 12 and the DAC 20.

The panel controller 12 makes timing conversion and tonality conversion to the input display data in accordance with the specification of the STN panel 4 to produce the display data, and supplies it and the panel control signal to the liquid crystal driver 5. The converted display data is pixel data of the STN panel 4 which is outputted on real time basis for the scan of the STN panel.

On the other hand, the DAC 20 converts the input display data to an analog video signal suitable to the CRT and supplies it to the CRT connector.

The liquid crystal driver 5 selects a liquid crystal drive voltage 7 generated by the liquid crystal drive voltage generator 6 in accordance with the panel control signal and the display data received from the panel controller 12, and supplies it to the STN panel 4.

The liquid crystal drive voltage generator 6 generates the liquid crystal drive voltage 7 for driving the liquid crystal of the STN panel 4, from the power supply received from the power supply unit 14 of the main body 2 through the panel connector 17.

An example of the interface signals in the panel connector 17 and the main body connector 18 is shown in FIG. 9.

In FIG. 9, A0–A9 denote address signals. D0–D7 denote data signal, AEN denotes an address enable signal, and MEMR, MEMW, IOR and IOW denote read/write commands for the memory and the I/O devices. IRQ denotes an interruption request signal and CLK denotes a reference clock of the bus. The image signal from the main body 2 is sent to the display controller 11 by using those signals.

Those signals are on the system bus and included in the expansion slot 15.

The signals of the expansion slot 15 further include a DMA control signal but it is omitted since it has no connection with the control of the flat panel 1. When the flat panel 1 which need to have a high arithmatic operation ability and process a large volume of display data is used, a DMA control signal may be added if high speed memory transfer is to be done by using the DMA control.

In FIG. 9, the signals of the panel power supply line 10 are designated by 5 V, VLCD and GND. 5 V denotes a drive voltage of the circuit in the flat panel 1, and VLCD denotes a drive voltage for the liquid crystal.

Figure 6:
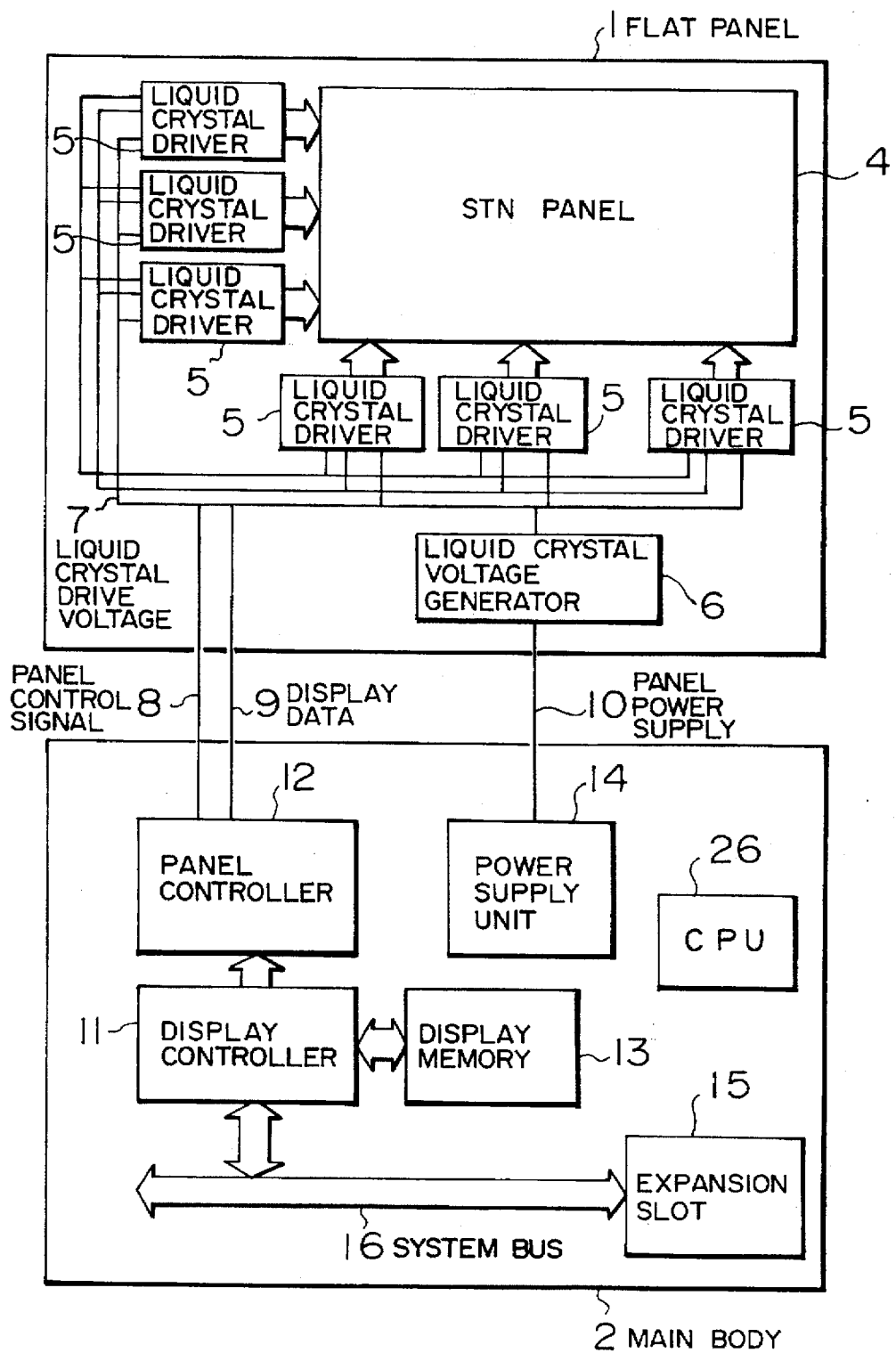
FIG. 6 shows a block diagram of an internal configuration of a main body and a flat panel of the prior art information processing apparatus.

A difference between the signals of FIG. 9 and the panel control signal 8 and the display data 9 of FIG. 6 which are the interface of the prior art flat panel 1 is that the timing and the specification of the signals of FIG. 9 do not vary with the type of the flat panel 1.

In addition, in the prior art information processing apparatus (FIG. 6) described above, since the interfaces of the data of the main body 2 and the flat panel 1 interconnected by the cable are the display data 9 which is pixel data produced on real time basis for the scan of the STN panel and the panel control signal 8 synchronized therewith, the data transmission rate between the main body 2 and the flat panel 1 is high when the flat panel such as a color TFT liquid crystal panel or other high density display panel and problems arise with respect to the synchronization and the noise reduction.

On the other hand, in the information processing apparatus of the present embodiment, since the data interface of the main body 2 and the flat panel 1 is the image information transferred over the system bus at a fixed data rate without regard to the type of the flat panel 1, the synchronization and the noise reduction are not difficult to attain even if the flat panel such as the color TFT liquid crystal panel or other high density display panel is used.

Contrary to the above advantage, there is the following disadvantage. In the interface of the prior art flat panel 1, the signal lines are as many as twenty including the panel control signal 8 and the display data 9. However, in the example shown in FIG. 9. 50 signal lines are required. There is a trend of increase of the signal lines as the multi-colorization and the high density of the flat panel 1 are promoted, but even in that case, the signal lines are up to 30 to 40. The increase of the signal lines leads to the increase of the volume and cost of the main body connector 18 and the panel connector 17. Further, since the flat panel 1 is pivotable, there is a difficulty in the construction. Accordingly, it is essential to reduce the signal lines. In FIG. 9, the address signals A0–A19 and the data signal D0–D7 are separate although they may be assigned to one signal line which is used by time sharing. The above disadvantage may be solved by the time-sharing.

Figure 3:
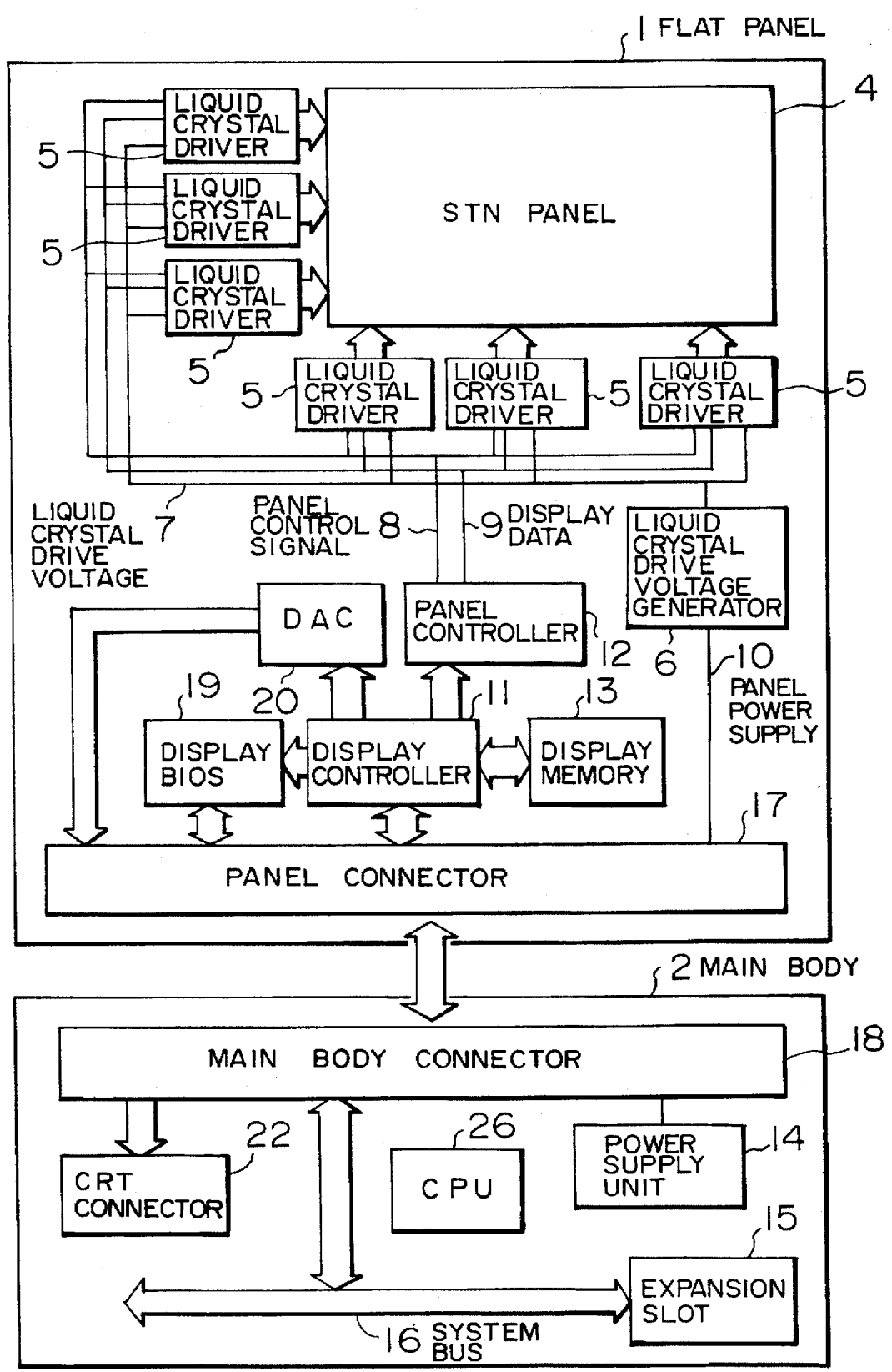
FIG. 3 shows a block diagram of a second internal configuration of the main body and the flat panel of the embodiment of the information processing apparatus of the present invention.

As shown in FIG. 3, the CRT connector 22 may be provided in the main body 2.

In this case, the analog video signal from the DAC 20 to the CRT connector 22 is added as the interface of the panel connector 17 and the main body connector 18. An apparatus which uses a flat panel with a touch panel is now explained.

Figure 4:
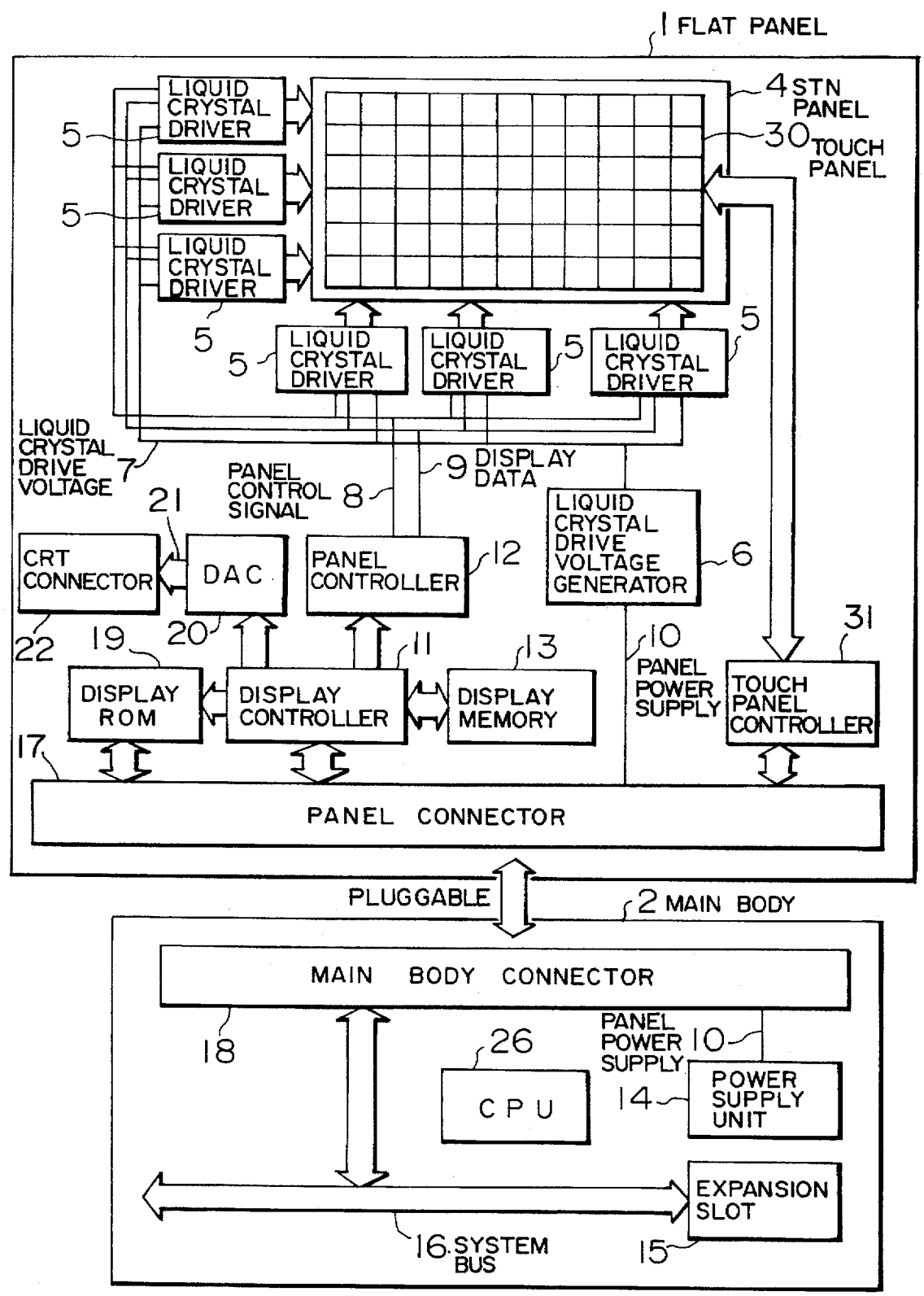
FIG. 4 shows a block diagram of a third internal configuration of the main body and the flat panel of the embodiment of the information processing apparatus of the present invention.
Figure 5:
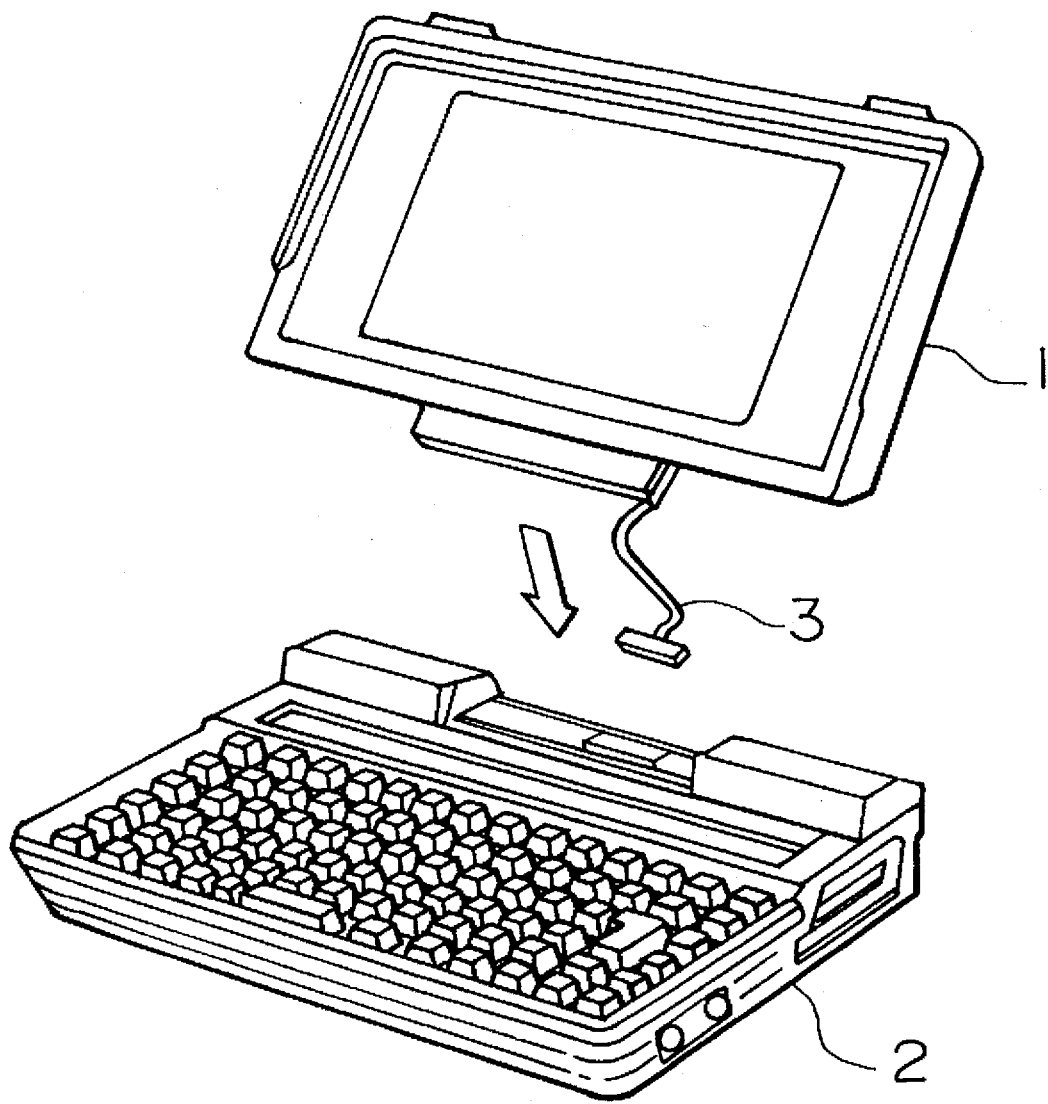
FIG. 5 shows a construction of a prior art information processing apparatus.

An internal configuration of the main body 2 and the flat panel 1 is shown in FIG. 4. As to the internal configuration of the main body 2, only those which relate to the control of the flat panel 1 are shown.

In the illustrated configuration, the flat panel 1 of the information processing apparatus shown in FIG. 2 has been replaced by the flat panel with a touch panel.

The configuration of the flat panel shown in FIG. 4 differs from that of the flat panel shown in FIG. 2 in that the former is provided with a touch panel 30 and a touch panel controller 31.

The touch panel 30 is overlayed on the display screen of the STN panel 4, and the touch by a user is detected for each section. The touch panel controller 31 transfers the detection output of the touch panel 30 to the main body 2 through the panel connector 17.

The touch panel controller 31 is connected to the system bus 16 through the panel connector 17 and the main body connector 18 as is the display controller 11.

Accordingly, the CPU of the main body 2 which is connected to the system bus 16 may utilize the detection output of the touch panel for any purpose.

Like the embodiment of FIG. 4, the present invention may be applied to an ATM terminal. In the ATM, the user interface is important and the display device and the entry device are of special design unlike those of consumer products such as a personal computer. In this case, the special device may be connected in place of the flat panel 1 and the main body 2 may be shared with the personal computer in order to enhance a development efficiency.

In accordance with the information processing apparatus of the present invention, the signals on the system bus 16 are used as the common interface to the flat panels of various types and the main body and the hardware which depends on the type of flat panel is provided in the flat panel. Accordingly the flat panel may be replaced without modifying the hardware of the main body. Since the signals on the system bus 16 are used as the common interface to the flat panels of various types and the main body, various types of input/output devices such as a touch panel and a light pen may be connected to the main body.

Further, where the display ROM which stores the software to control the display is built in the flat panel 1, the modification of the software, in addition to the hardware, of the main body is eliminated.

In the prior art portable information processing apparatus, a packaging space in the main body is short because of the enhancement of functions and the compactness, and the size reduction of a circuit board of the main body has been demanded. On the other hand, there is still a room for reduction of a packaging space in the flat panel because a minimum size of the liquid crystal panel is secured and high density integration of the liquid crystal driver has been attained.

Accordingly, by building the display controller 11, the panel controller 12 and the display memory 13 in the flat panel 1 as they are in the present embodiment, the number of parts of the main body is reduced and the compactness of the information processing apparatus is attained.

Figure 7:
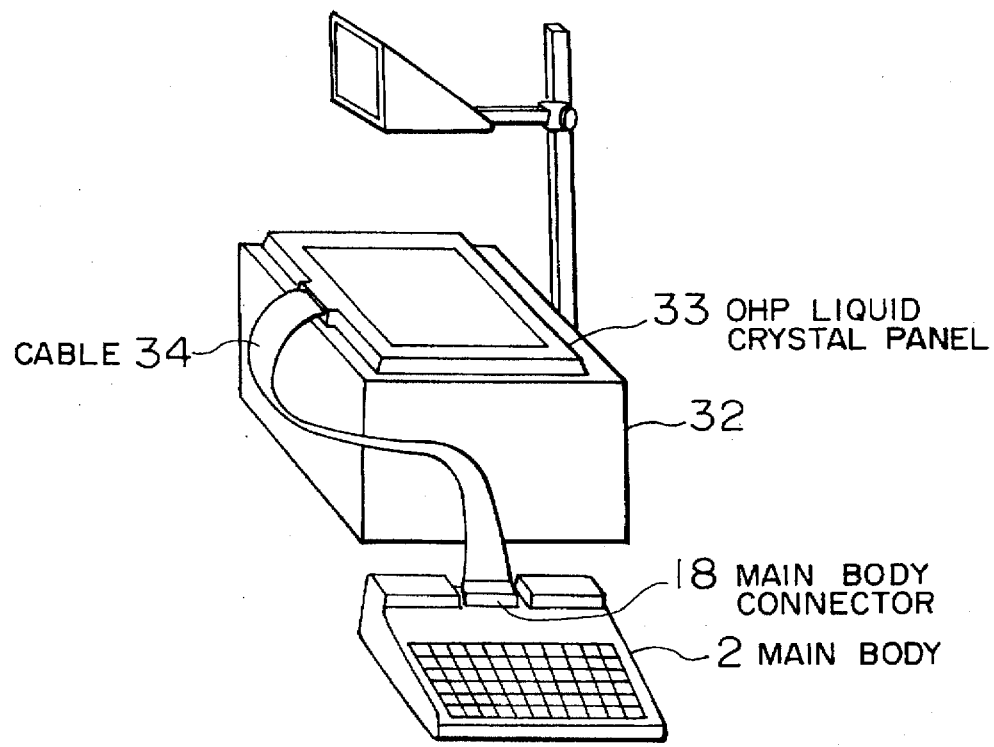
FIG. 7 shows a construction of another embodiment of the information processing apparatus of the present invention.
Figure 8:
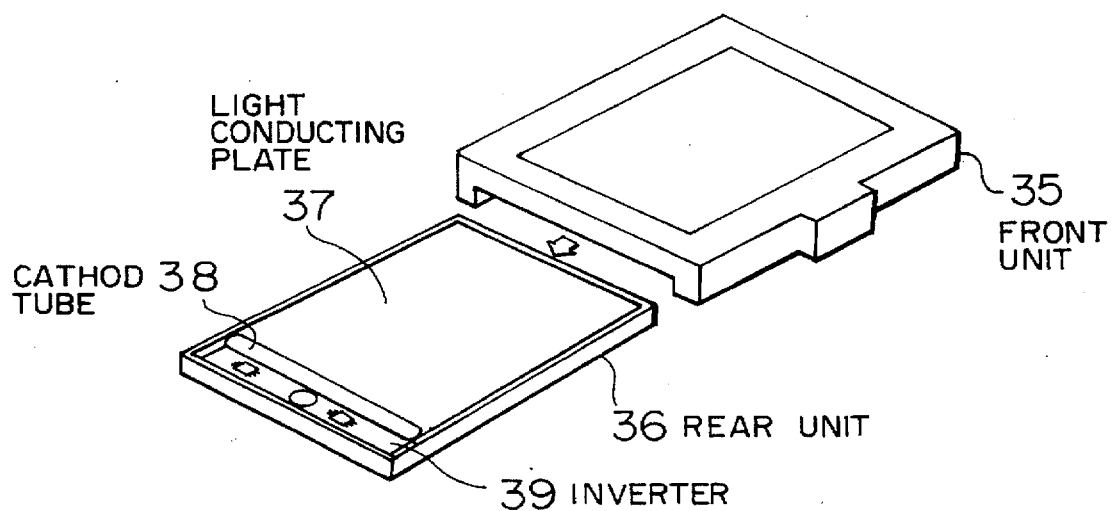
FIG. 8 shows a construction of an OHP liquid crystal panel in other embodiment of the information processing apparatus of the present invention.

Embodiments of the present invention are shown in FIGS. 7 and 8.

FIG. 7 shows an application to an overhead projector (OHP) 32. The OHP 32 normally displays an image printed or hand-written on a transparent sheet onto a screen. Recently, an OHP liquid crystal panel 33 which is used in place of the OHP sheet so that an image displayed on the liquid crystal panel is displayed on the screen has been marketed. Since the OHP liquid crystal panel does not need printing and permits correction with ease and can display animation unlike the OHP sheet, it has become popular as a presentation tool.

In the present embodiment, the OHP liquid crystal panel 33 is connected in place of the flat panel 1 of FIG. 3. The main body 2 and the liquid crystal panel 33 are interconnected by the cable 34 through the main body connector 18. FIG. 8 shows a construction of the OHP liquid crystal panel 33. The OHP liquid crystal panel 33 comprises two interlinked cases, a front unit 35 and a rear unit 36. The front unit 35 includes an STN panel 4 and a peripheral circuit such as a display controller 11, as does the flat panel 1 of FIG. 2. The rear unit 36 includes a back-light unit, a light conducting plate 37, a cathode tube 38 and an inverter 39 for driving the cathode tube. When the OHP liquid crystal panel 33 is to be used as a conventional personal computer, the front unit 35 and the rear unit 36 are overlapped and it is directly connected to the main body connector 18 as shown in FIG. 1. When it is to be used for the OHP 32, the OHP liquid crystal panel 33 is removed from the main body 2 and the rear unit 36 is removed from the OHP liquid crystal panel 33. The front unit 35 is connected to the main body 2 through the cable 34 and laid on the OHP 32.

A reason why the OHP liquid crystal display 33 is divided into the front unit 35 and the rear unit 36 which is removable from the front unit 35 is explained below. Since the OHP 32 projects a light from the bottom plane of the OHP liquid crystal panel 33 to display the image on the liquid crystal onto the screen, it is necessary to prevent the light emitted from the OHP 32 from being intercepted by the light conducting plate 37 and the case. The light from the cathode tube 38 may be used for the screen display, but the construction of FIG. 8 is preferable because there is a big difference between the brightness when viewed directly by an eye and the brightness when projected on the screen.

In the present embodiment, since the liquid crystal panel may be shared for the normal use and the OHP use, the cost is reduced and the OHP system is compacted. It is effective to make presentation by carrying the apparatus.

While the present invention has been shown and described in connection with the flat panel display, the present invention is applicable to any display device which uses the interface of the flat panel.

What is claimed is:

1. An information processing apparatus comprising:

a main body including a CPU and a read/write bus which is readable/writable directly by said CPU; and a display device including a panel type display and display control means storing attribute information of said panel type display which is readable/writable by said CPU through said read/write bus, said display control means controlling the display of said panel type display in accordance with display data received from said CPU through said read/write bus;

wherein said main body is not provided with display control means for processing data in accordance with characteristics of said panel type display so that any said display device of a plurality of display devices having different panel type displays is operably connectable with said main body, and said CPU enables direct reading of said attribute information from said display device through said read/write bus and enables direct writing of said display data to said display device in accordance with characteristics of said panel type display through said read/write bus, said display control means processing said display data in accordance with characteristics of said panel type display.

2. An information processing apparatus according to claim 1, wherein said display device includes input means for accepting designation of a position on said panel type display and sends the data at the accepted position to said CPU through said panel connector, said main body connector and said read/write bus.

3. A display controller comprising:

a main body including a CPU; and a display device including a panel type display having display control means for processing data in accordance with characteristics of said panel type display and having an interface to said main body on a system bus to be used by said CPU so as to enable panel type displays with different characteristics to be connected with said main body, said display control means including a display ROM for storing therein attribute information of said panel type display connected to said system bus through a panel connector which is mutually detachable connectable with a main body connector of said main body;

wherein said main body is not provided with display control means for processing data in accordance with characteristics of said panel type so that any said display device of a plurality of display devices having different panel type displays is operably connectable with said main body.

4. An information processing apparatus comprising:

a main body including a power supply unit, a CPU, and a main body connector connected to a read/write bus which is readable/writable directly by said CPU and said power supply unit; and a display device including a panel connector connected to said main body connector, a panel type display, a display memory for storing display data received from said CPU through said read/write bus, said main body connector and said panel connector, display control means for generating panel display data for said panel type display in accordance with the display data stored in said display memory, said display control means storing attribute information of said panel type display which is readable/writable by said CPU through said read/write bus, and drive means connected to said panel type display and said panel connector for driving said panel type display in accordance with said panel display data generated by said display control means and a power supply received from said power supply unit of said main body through said main body connector and said panel connector, said panel connector being mutually detachably connectable with said main body connector;

wherein said CPU enables direct reading of said attribute information from said display device through said read/write bus and enables direct writing of said display data to said display memory of said display device in accordance with characteristics of said panel type display through said read/write bus, said display control means reading said display data stored in said display memory and generating said panel display data in accordance with characteristics of said panel type display.

5. An information processing apparatus according to claim 4, wherein said display device includes input means for accepting designation of a position on said panel type display, and input control means connected to said panel connector and said input means for generating data at the designated position accepted by said input means and sending the generated data to said CPU through said panel connector, said main body connector and said read/write bus.

6. An information processing apparatus according to claim 4, wherein said display device includes memory means connected to said panel connector for storing a program for said means of said display device or said CPU of said main body to control said display device.

7. An information processing apparatus according to claim 4, wherein said display device includes video signal generation means for generating an analog video signal in accordance with said data stored in said display memory, and an output terminal for outputting the analog video signal generated by said video signal generation means to external means.

8. A display device comprising:

a panel connector to be connected to a main body including a CPU, a read/write bus which is readable/writable directly by said CPU and a main body connector connected to said read/write bus, through said main body connector;

a panel type display; and display control means disposed exteriorly of said main body connected to said panel type display for controlling the display of said panel type display in accordance with display data received from said CPU disposed exteriorly of said display device through said read/write bus, said main body connector and said panel connector, said display control means processing said display data in accordance with characteristics of said panel type display stored in said display control means as attribute information, said display control means including said read/write bus as an interface;

wherein said CPU enables direct reading of said attribute information from said display device through said read/write bus, and enables direct writing of said display data to said display control means in accordance with characteristics of said panel type display through said read/write bus, said display control means processing said display data in accordance with characteristics of said panel type display.

9. A display device according to claim 8 further comprising input means for accepting designation of a position on said panel type display, wherein said input means send the accepted designated position data to said CPU through said interface connector and said system bus.

10. A display device according to claim 8 further comprising means for enhancing a brightness of said panel type display, wherein said brightness enhancing means is removable from said display device.

11. A method for configuring an information processing apparatus by connecting one of a plurality of different types of display devices each including a panel type display to a main body including a CPU and a read/write bus which can be directly readable/writable by said CPU, comprising the steps of:

providing each of said display device with all circuits which depend on the types of said display devices for enabling display, each display device including a panel connector mutually detachably connectable with a main body connector of said main body, and a display control means storing attribute information of said panel type display which is readable/writable by said CPU through said read/write bus; and establishing interface of said display device and said main body on said read/write bus and controlling by said display control means display of said panel type display on the basis of display data received from said CPU through said panel connector, said main body connector and said read/write bus;

wherein said CPU enables direct reading of said attribute information from said display device through said read/write bus, and enables direct writing of said display data to said display device in accordance with characteristics of said panel type display through said read/write bus, said display control means processing said display data in accordance with characteristics of said panel type display.

12. A method according to claim 11, wherein the circuits which depend on the types of said display devices are not provided in said main body.

13. An information processing apparatus comprising:

a main body including a CPU, a system bus having address, data and control signals inputted/outputted to/from said CPU and a main body connector connected to said system bus; and a display device including a panel connector connected to said main body connector, a panel type display, a display control means including a display ROM for storing therein attribute information of said panel type display connected to said system bus through said panel connector, and said display control means controlling display of said panel type display on the basis of data received from the CPU through said panel connector, said main body connector and said system bus, wherein said main body connector is mutually detachably connected to said panel connector, and wherein said main body is not provided with display control means for processing data in accordance with characteristics of said panel type display so that any said display device of a plurality of display devices having different panel type displays is operably connectable operably connectable with said main body.

14. A display device comprising:

a panel connector to be connected to a main body including a CPU, a read/write bus which is readable/writable directly by said CPU and a main body connector connected to said read/write bus, through said main body connector;

a panel type display;

a display memory for storing display data received from said CPU through said read/write bus, said main body connector and said panel connector; and display control means for generating panel display data for said panel type display in accordance with display data stored in said display memory, said display control means storing attribute information of said panel type display which is readable/writable by said CPU through said read/write bus, and drive means connected to said panel type display and said panel connector for driving said panel type display in accordance with said panel display data generated by said display control means and a power supply received from a power supply unit of said main body through said main body connector and said panel connector, said panel connector being mutually detachably connectable with said main body connector;

wherein said CPU enables direct reading of said attribute information from said display device through said read/write bus, and enables direct writing of said display data to said display memory of said display device in accordance with characteristics of said panel type display through said read/write bus, said display control means reading said display data stored in said display memory and generating said panel display data in accordance with characteristics of said panel type display.

* * * * *